July 20, 1965    H. E. PRICE    3,195,593
APPARATUS FOR HANDLING LOGS
Filed June 15, 1961    6 Sheets-Sheet 1

Fig.1

INVENTOR.
HOWARD E. PRICE
BY Williams, David
Hoffmann & Yount
ATTORNEYS

INVENTOR.
HOWARD E. PRICE

FIG. 6b

INVENTOR.
HOWARD E. PRICE

3,195,593
Patented July 20, 1965

3,195,593
APPARATUS FOR HANDLING LOGS
Howard E. Price, Painesville, Ohio, assignor to The Coe Manufacturing Company, Painesville, Ohio, a corporation of Ohio
Filed June 15, 1961, Ser. No. 117,458
5 Claims. (Cl. 144—209)

The present invention relates to the manufacture of veneer and more particularly to apparatus for charging or loading logs into veneer and rossing lathes, and the like.

One of the principal objects of the invention is the provision of a novel and improved apparatus for charging or loading a cylindrical or approximately cylindrical article such as, a log or the like, into a machine having rotatable spindles, such as, a veneer lathe or the like, with the longitudinal center of the article aligned or approximately aligned with the axis of rotation of the machine spindles.

Another of the principal objects of the invention is the provision of a novel and improved apparatus for charging or loading logs and the like into a machine for rotation between axially aligned spindles, for example, a veneer lathe, so that the longitudinal center of the log coincides or approximately coincides with the axis of rotation of the machine spindles, with a minimum, if any, attention on the part of the operator and with a minimum of interference with or from other operations being carried on in the same or adjacent locations.

More specifically, the invention contemplates the provision of a novel and improved apparatus for automatically or semi-automatically transferring logs from one place, for example, a storage pond, to a machine, for example, a debarker or a veneer lathe, in which the logs are rotated between axially aligned spindles the longitudinal centers of the logs aligned or approximately aligned with the axis of rotation of the spindles.

Another of the principal objects of the invention is the provision of novel and improved automatic or semi-automatic equipment for rossing or peeling logs in a continuous manner comprising a rossing lathe or a veneer lathe in which the logs are rotated between aligned spindles, and apparatus for sequentially transferring logs from a storage or like place into the lathe with their center lines aligned or approximately aligned with the axis of rotation of the spindles of the lathe.

The invention resides in certain constructions and combinations of parts and further objects and advantages will be apparent to those skilled in the art to which it relates from the following description of the preferred embodiment described with reference to the accompanying drawings forming a part of this specification, and in which:

While the invention is susceptible of embodiment in various apparatuses, the present preferred embodiment is shown in the drawings and herein described in detail. It is to be understood, however, that there is no intention to thereby limit the invention to the specific apparatus disclosed, but it is my intention to cover all apparatuses falling within the scope of the invention herein disclosed.

The particular machine tool shown in the drawings as exemplifying apparatus in which the present invention is utilized with especially advantageous results is a veneer peeling apparatus, but it is to be understood that the invention may be employed in apparatus for rossing logs or for performing other work quite different from any suggested herein.

Referring to the drawings, the reference character A designates a conveyor for sequentially delivering logs L from a storage pond or some other place, to two clamp assemblies B, B', spaced with respect to one another transversely of the direction of log movement and forming a part of a log charger carriage C which carriage is movable into and out of the lathe D. The conveyor A shown is driven by an electric motor and is intermittently operated as will be hereinafter more fully explained.

Each clamp assembly comprises a pair of clamp members having dihedral or V-shaped abutments or clamping faces facing one another and located at opposite sides of an imaginary vertical plane $d$ parallel with the axis of rotation $e$ of the aligned spindles of the veneer lathe. Alternatively it may be stated that the abutment or clamping faces of each pair of clamp members are symmetrically arranged about an imaginary line $h$ parallel with the axis of rotation $e$ of the spindles of the lathe.

With opposite ends of a log loosely interposed between the clamp members of the respective clamp assemblies, the members of each pair are simultaneously moved towards one another at the same speeds to align or approximately align the center of the log with the imaginary line $h$, previously referred to, and to clamp opposite ends of log therebetween. With opposite ends of the log securely held by the clamp members the carriage is moved into the lathe to position the log carried thereby between the spindles of the lathe with its longitudinal center aligned or approximately aligned with the axis of rotation $e$ of the spindles. With the log positioned between the spindles of the lathe, the spindles are moved into engagement with the ends of the log, the log carriage C retracted, and the peeling operation commenced. After the log has been peeled the spindles are retracted, the core log dropped and removed and a new log loaded into the lathe. The operations are preferably all performed automatically with an overriding operator control.

The particular constructions of the conveyor A and the lathe D form no part of the present invention and are not herein shown and described in detail. Suffice it to say that the lathe shown is generally similar to the lathe shown in Haumann, Patent No. 2,501,387, less the outboard supports for the spindles, and comprises a main drive electric motor for rotating the head and tail spindles, 7, 8, respectively, and feeding the knife carriage E, an electric motor for traversing the knife carriage, a liquid operated motor for reciprocating the pressure bar F, and liquid operated, double acting, reciprocating type motors for moving the spindles towards and from one another.

The respective clamp assemblies B, B' are alike in construction and are supported and operated in a similar manner. Because of this only the clamp assembly B at the far side of the apparatus, as it is viewed in the drawings, including the clamp members thereof and the supporting and operating mechanism therefor will be described in detail. The corresponding parts of the other clamp assembly B' will be designated by the same reference characters with a prime mark affixed thereto.

The right-hand log centering and clamping member 10 of the pair of log centering and clamp members 10, 11 of the clamp assembly B at the far side of the machine, as shown, is in the form of a discrete member welded or otherwise fixedly secured to the top of a rectangular shaped member 16 slidably supported on the top of a plate 17 which forms the frame or body of a reciprocable carriage C movable between the position shown in the drawing and a position within the lathe D. While the clamp member 10 is shown formed as a separate member welded to the slide member 16, it is to be understood that it could be formed integral therewith. Interposed between the plate 17, which forms the frame or body of the carriage C, and the lower end of the member 16, is an elongated channel-like member 18 secured to the upper face of the plate 17 and having a wear-plate 19 secured in the bottom of the channel portion thereof upon which the member 16 is directly supported. The lower end of the member 16 is engaged between the upwardly extending sides or flanges of the channel member 18. The member 16 is held in position on the wear-plate 19 and reciprocated lengthwise of the channel member 18 by a shaft 25 rotatably supported in bearing members 26, 27 secured to the upper surface of the plate 17 adjacent to opposite ends of the member 18, the right-hand end of which shaft projects through the member 16 and has a threaded section 28 in engagement with a nut 29 fixedly secured in the member.

The dihedral or V-shaped log centering and clamping face of the clamp member 10 is formed by two planar surfaces 30, 31 on the side of the clamp members facing towards the lathe, the intersection of which surfaces lies in an imaginary plane $k$ which includes the axis of rotation $e$ of the lathe spindles and the line $h$.

The second or other clamp member 11 of the pair of clamp members at the far side of the apparatus is, in the embodiment shown, a discrete angular member upon which the dihedral or V-shaped log centering and clamping face is formed by two planular log engaging surfaces 32, 33 similar to the corresponding surfaces 30, 31 of the first clamping member 10 but facing in the opposite direction. The member 11 is fixedly secured, in the present instance welded, to the hub 35 of a crank lever 36, fixedly keyed to a shaft 37 rotatably supported in a second slide member 40 slidably supported in the front end of the channel member 18 in a manner similar to that in which the slide member 16 is secured therein. Like the slide member 16 the member 40 is provided with a nut 41 having threaded engagement with a second threaded section 42 on the shaft 25. The threaded section 42, however, is of a different hand from the section 28 with the result that as the shaft 25 is rotated first in one direction and then in the other by an electric motor 45 fixed to the plate 17 and connected to the right-hand end of the shaft 25 by a sprocket chain drive 46, the slide members 16, 40 and in turn the clamp members 10, 11 affixed thereto move towards and from each other.

Figures 3, 4:
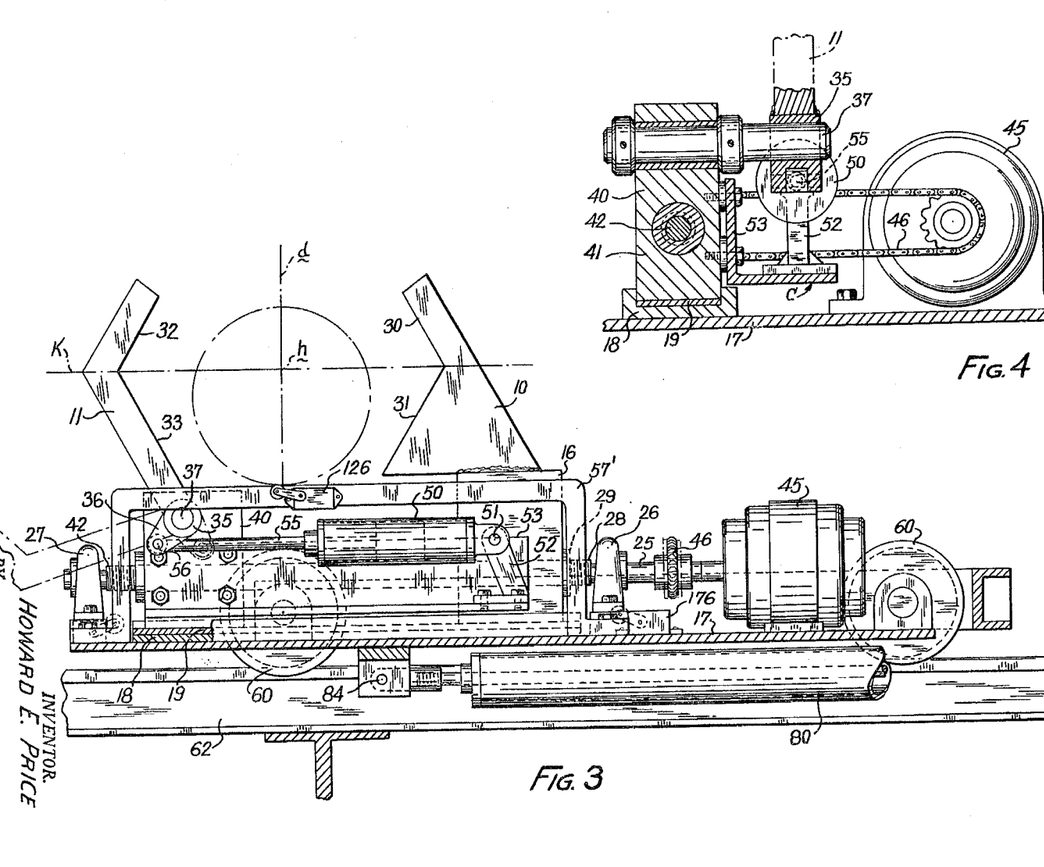
FIG. 3 is a sectional view approximately on the line 3—3 of FIG. 2.
FIG. 4 is a sectional view approximately on the line 4—4 of FIG. 2.
Figure 5:
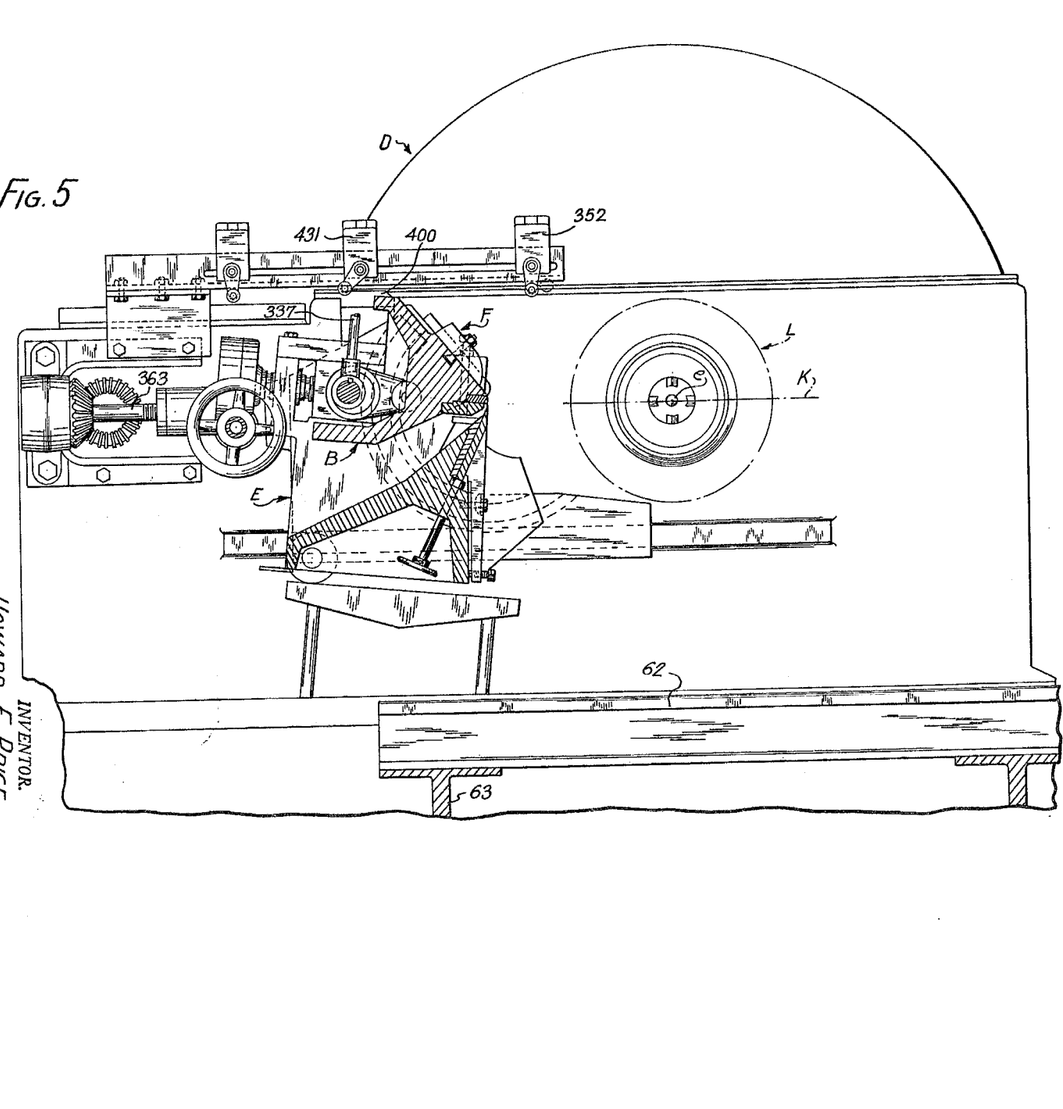
FIG. 5 is a sectional view approximately on the line 5—5 of FIG. 2.
Figure 6A:
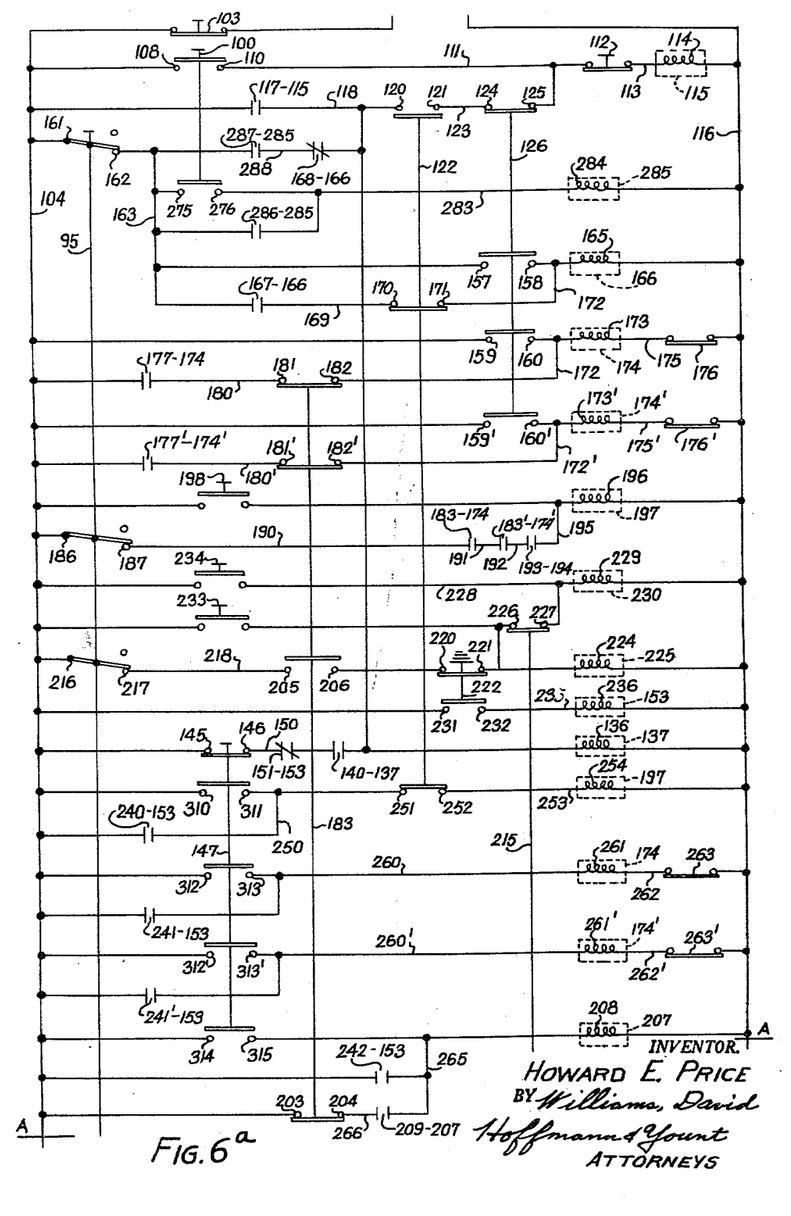
FIGS. 6a and 6b are wiring diagrams of the electrical controls for the apparatus.
Figure 6B:
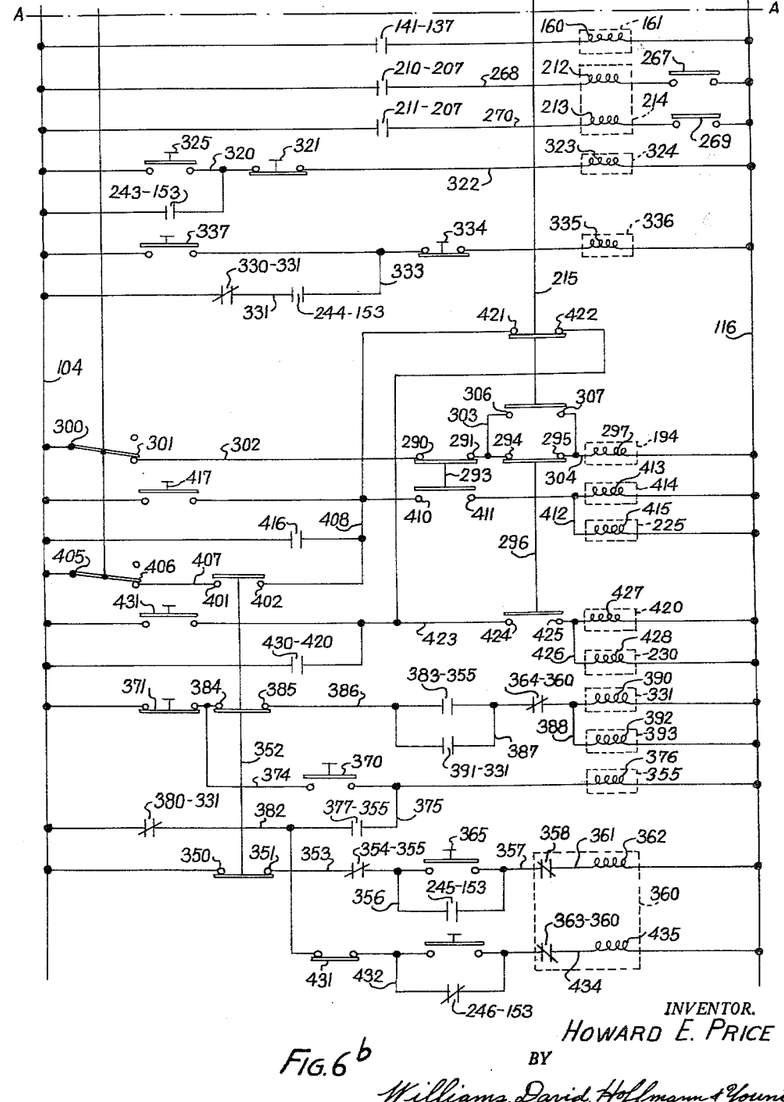

Shaft 37, which carries the clamp member 11, is rotatably supported in the slidable member 40 against axial movement therein and projects therefrom towards the near side of the apparatus. The shaft is adapted to be oscillated through approximately 90° to move the clamp member 11 between the positions shown in full and dot-dash lines in FIG. 3 by a double acting reciprocating-type fluid pressure actuated motor 50 comprising a cylinder assembly pivotally connected by a pivot pin 51 to a bracket 52 secured to one flange of an angle member 53, the other flange of which is bolted to the side of the slide member 40 from which the shaft 37 projects. The piston rod 55 of the motor is connected, by means of a link adjustably fixed thereto, to the free end of the crank lever 36 by a pivot pin 56. The limits of movement of the member 11 are determined by the piston of the motor 50 striking one or the other ends of the cylinder within which it reciprocates. A log positioned between the clamp members 10, 11, when in their positions shown in the drawings, is adapted to rest upon an angle member 57 having opposite ends bolted to the member 17.

The plate 17, which carries the two pairs of clamp assemblies, just described, is supported for movement into and out of the lathe D by pairs of wheels 60 at its near and far sides connected thereto adjacent to the corners of the plate and adapted to travel along a runway or trackway formed by two rails 61, 62 supported on a plurality of I-beams 63 and extending into the lathe and positioned at right angles to the axis of rotation $e$ of the lathe spindles. The wheels 60 are rotatably and slidably supported on stud shafts 65 fixedly secured within bosses formed integral with the plate 17 adjacent to the corners thereof and slidably supported suitable bearing assemblies connected to side plates 66, 67 of the carriage C, the former of which is at the near side of the apparatus and the latter at the far side thereof. The bearing members carried by the side plates 66, 67 of the frame of the carriage C are spaced outwardly of the adjacent edges of the plate 17 a distance equal to approximately twice the width of the wheels 60, and the shafts 65 upon which the wheels are slidably and rotatably supported are of sufficient length to permit reciprocation of the plate 17 and the mechanism carried thereby transversely of the trackway formed by the rails 61, 62 a limited amount.

During operation the plate 17 is normally located in a predetermined position with respect to one side of the trackway or the other, depending upon the manner in which the spindles of the lathe D are moved in chucking a log therebetween. In the embodiment shown, the near spindle 8 of the lathe is the tail spindle and may remain in the same axial position with the far or head spindle 7 being reciprocated to clamp the log between the spindle chucks and to release the core log. The plate 17 is shown in the drawings positioned midway between the sides of the trackway. The position of the plate 17 is determined by the actuation of limit switches on the plate 17 by an adjustable stop 68 carried by the member 67 of the frame of the charger carriage C. The plate 17 is free to move towards either side of the apparatus as a log held in the clamp assemblies is moved towards one or the other of the sides of the lathe during the log chucking operation and is subsequently returned to its original position by reciprocating-type fluid actuated, preferably air, motors 70, 71, the cylinder assemblies of which are connected to the inside of the near end plate 66 of the frame of the carriage and the pistons of which are connected to brackets 72, 73 bolted to the upper side of the plate 17 adjacent to the near edge thereof. The motors 70, 71 are preferably of the double acting type to allow for chucking by moving either or both spindles.

The log charger carriage C is adapted to be reciprocated between the position shown in the drawings and a position in which the center of a log carried by the clamp assemblies B, B′ aligns with the axis of rotation of the spindles 7, 8 of the lathe D by a double acting reciprocating-type fluid actuated, preferably oil pressure, motor 80, the cylinder assembly of which is pivotally connected to an angle bracket 81 fixed to one of the rails supporting I-beams 63. The piston assembly of the motor 80 is connected to a bracket 84 fixed to the underside of the transversely extending member 85 secured by means of end plates 86, 87 to the side plates 66, 67, respectively, of the log carriage C.

With the parts of the apparatus in the position shown in the drawings, that is, with the log charger carriage C and the knife carriage E in their out or retracted positions and a two position "selector" switch 95 in its "automatic" position rather than its "manual" position, thereby effecting automatic operation of the apparatus as distinguished from manual operation, the apparatus is started by the operator depressing a "start" push button switch 100 to start the conveyor A and either raise the clamp members 11, 11′ of the clamp assemblies B, B′ or maintain them in their raised position. The depressing of start switch 100 establishes a circuit from the line 101 through the normally closed contacts of "stop-all" push button switch 103, wire 104, normally opened, but now closed, contacts 108, 110 of start push button switch 109, wire 111, normally closed contacts of "stop conveyor" push button switch 112, wire 113, and operating solenoid 114 of motor controller 115 for the conveyor A drive motor to line 116. This starts the conveyor A and closes a normally open pair of holding contacts 117 of the motor controller 115, which holding contacts establish a circuit from the wire 104, now closed contacts 117, wire 118, closed contacts 120, 121 of "charger carriage out" limit switch 122, wire 123, normally closed contacts 124, 125 of "log" actuated switch 126, to the wire 111 to continue the operation of the motor for the conveyor A after the operator has released the start switch 109. The normally open contacts 120, 121 of carriage out limit switch 122 prevent establishment of the conveyor motor holding circuit unless the carriage C is in position to receive a log from the conveyor A.

The closing of the normally open contacts 117 of relay 115 also establishes a circuit from the wire 118 and operating solenoid 136 of log clamp relay 137 to line 116 closing its normally open contacts 140, 141. The closing of contacts 140 establishes a holding circuit for the relay from the wire 104 through the normally closed contacts 145, 146 of "charger carriage return" push button switch 147, wire 150, now closed contacts 151 of "cycle" relay 153, wire 154, now closed holding contacts 140 of relay 137 to wire 111. The closing of contacts 141 of relay 137 establishes a circuit from a wire 104 through the operating solenoid 155 of a solenoid valve 156 which controls the flow of fluid pressure to and from the motors 50, 50', connecting the motors to the fluid supply source and to exhaust in such a manner that the motors tend to move the clamp members 11, 11' to the up or raised position shown in full lines in the drawings. In the event these members are already in this position no movement of the members takes place but fluid is supplied to the motors to maintain them in their raised position.

The upper reach of the conveyor A moves towards the left until the leading log thereon drops into a position between the pairs of clamp members of the clamp assemblies B, B' on the carriage C. When this occurs the dropped log strikes the operating lever of the limit switch 126 and opens its normally closed contacts 124, 125 stopping the conveyor and closes its normally open contacts 157, 158 and 159, 160 and 159', 160'. The switch 126 is connected to the member 57' secured to the top plate 17 of the carriage C intermediate the clamp assemblies B, B' and in position to be engaged by a log resting upon the members 57, 57'.

The closing of normally open contacts 157, 158 establishes a circuit from the line 104 through the now closed contacts 161, 162 of selector switch 95, wire 163, now closed contacts 157, 158, wire 164 and operating solenoid 165 of relay 166 to line 116. Energization of the operating solenoid 165 of relay 166 actuates the relay to close its normally open contacts 167 and open its normally closed contacts 168. The closing of the contacts 167 establishes a holding circuit for the relay 166 from the wire 163 through the now closed contacts 167 of relay 166, wire 169, normally open but now closed contacts 170, 171 of charger out limit switch 122 to wire 164, etc. The purpose of the normally closed contacts 168 of relay 166 will be hereinafter apparent, but their opening prevents reenergization of the operating solenoid 114 of motor controller 115 upon the reclosing of the contacts 124, 125 of log actuated switch 126 while the charger carriage is in its retracted position.

The closing of contacts 159, 160 of log actuated switch 126 establishes a circuit from the wire 104 through now closed contacts 159, 160, wire 172, operating solenoid 173 of motor controller 174 for clamp motor 45, wire 175 and normally closed contacts of limit switch 176, to wire 116.

Energization of the solenoid 173 of motor controller 174 not only starts the rotation of the motor 45 in a direction to move the clamp members 10, 11 towards one another and in turn towards the log therebetween, but closes normally open holding contacts 177 of the motor controller thereby establishing a holding circuit for the motor from the wire 104, now closed contacts 177 of motor controller 174, wire 180 and normally closed contacts 181, 182 of "log charger carriage in" limit switch 183 to the wire 172, etc. The motor 45 is a so-called "torque" motor and continues to operate until it stalls. The overload subsequently occurring closes normally open contacts 184. The motor remains connected to the power lines and the contacts 183 closed. The far end of the log in the carriage, as viewed in the drawings, is now centered and securely clamped between the clamp members 10, 11. The limit switch 176 which is connected to the plate 17 of the carriage C is adapted to be opened by the right-hand end of the member 53 of the clamp assembly B in the event the motor 45 is operated without a log between the clamp members 10, 11 thus preventing overtravel of the clamp members.

Figure 1:
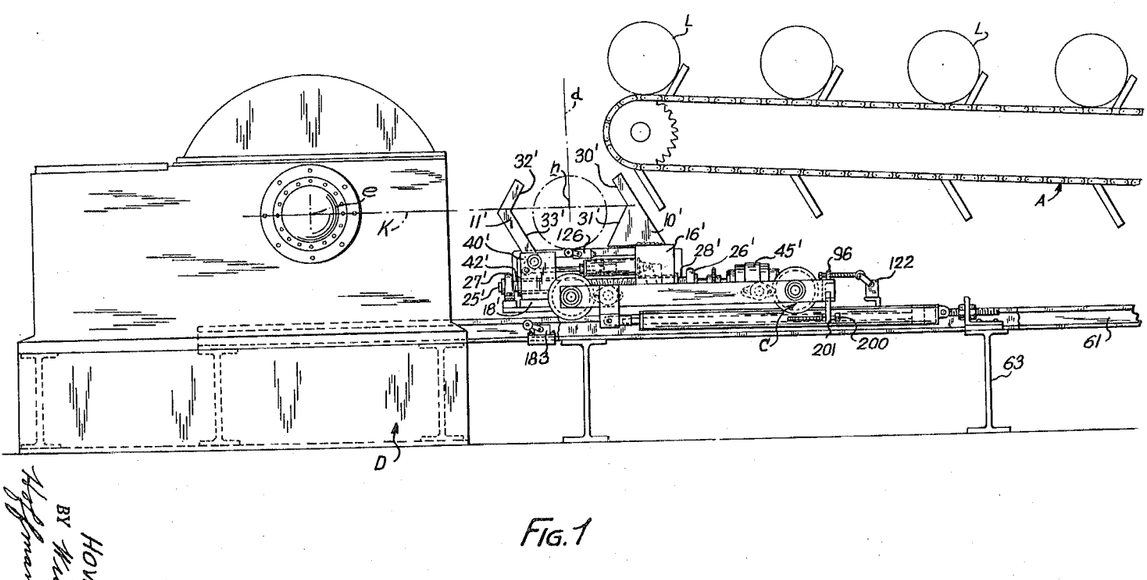
FIG. 1 is a side elevational view of equipment or apparatus for manufacturing veneer and embodying the present invention.
Figure 2:
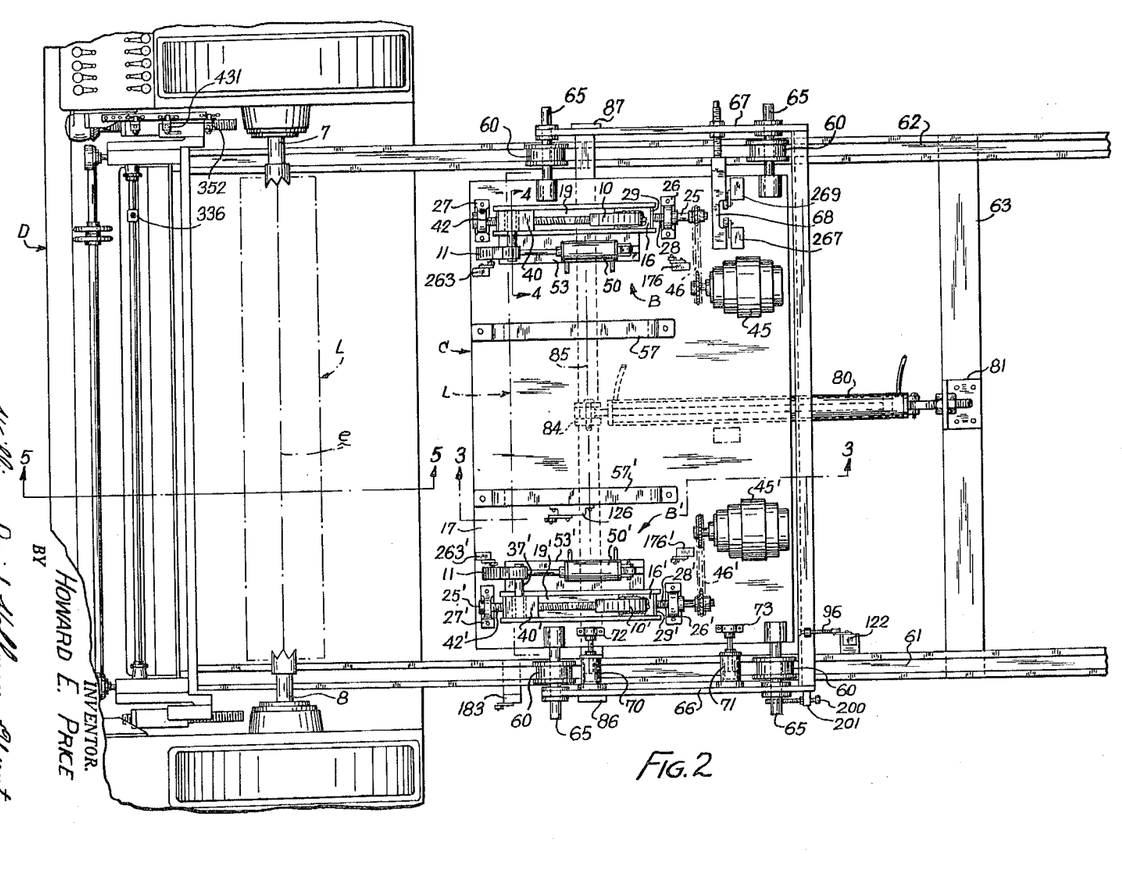
FIG. 2 is a plan view, with portions broken away, of the apparatus shown in FIG. 1.

The motor 45' of the near clamp assembly B' is started and controlled in a similar manner. The circuit will not be redescribed. Suffice it to say that the corresponding parts are designated on the drawings with similar reference characters but having prime marks affixed thereto. As the log is clamped by the clamp members 10, 11 and 10', 11', it is lifted above the members 57, 57', but the circuits to the motors 45, 45' are maintained by the holding contacts 177, 177' of their motor controllers after the contacts 159, 160 and/or 159', 160' open.

Upon the stalling of the motors 45, 45', normally open contacts 184, 184' of the motor controllers 174, 174', respectively, close. The closing of these contacts completes the circuit from the wire 104 through the now closed contacts 186, 187 of the selector switch 95, wire 190, contacts 184, wire 191, contacts 184', wire 192, normally open, but now closed contacts 193 of a lathe spindle out position relay 194, wire 195 and operating solenoid 196 of a fluid control valve 197 to the line 116. The valve 197 controls the flow of fluid to the motor 80 which reciprocates the carriage C and energization of the operating solenoid 196 of the valve 197 shifts the valve to the position to cause the piston rod of the motor 80 to be extended and move the carriage C with the log secured between the clamp members of the clamp assemblies B, B' thereof into the lathe. The contacts 193 of relay 194 prevent the carriage C from moving into the lathe automatically unless one or both of the lathe spindles, as will be hereinafter explained, are in their out or retracted positions. The carriage C can be moved into the lathe at any time by the operator depressing the "carriage in" push button switch 198. The forward or in position of the carriage C is controlled by the piston head of the motor 80 striking the left-hand end of the cylinder chamber within which it reciprocates. The cylinder of the motor is connected to the bracket 61 by adjustable nuts which provide means for adjusting the forward or in position of the carriage.

At or about the time the carriage reaches its forward position, that is, its position in the lathe, an adjustable stop 200, carried by a bracket 201 connected to the carriage C, contacts a log carriage in limit switch 183, carried by one of the cross beams 63 upon which the rails 61, 62 are supported and opens its normally closed contacts 181, 182 and 181', 182' and 203, 204 and closes its normally open contacts 205, 206. The opening of normally closed contacts 181, 182 and 181', 182' of the log charger carriage in limit switch 183 breaks the holding circuits for the operating solenoids 173, 173' of the motor controllers 174, 174' of clamp motors 45, 45', respectively, which in turn allows contacts 184, 184' to reopen and break the circuit to operating solenoid 196 of valve 197. The valve 197 is spring balanced to its neutral position and returns thereto upon the deenergization of solenoid 196. The hydraulic fluid in the motor 80, however, is trapped therein holding the charger carriage C in its in or forward position.

The opening of the normally closed contacts 203, 204, of the log charger carriage in limit switch 183 breaks a previously established holding circuit for a "charger centering" relay 207. The manner in which the holding circuit for relay 207 was established will be hereinafter referred to. Deenergization of the operating solenoid 208 of relay 207 allows its normally open contacts 209, 210, 211 to reopen. Contacts 209 are the holding contacts for the relay and contacts 210, 211 are in series circuit with the operating solenoids 212, 213, respectively, of a solenoid operated valve 214 which controls the supply of fluid to the charger carriage centering motors 70, 71. The opening of contacts 210, 211 of relay 207 prevents the actuation of the motors 70, 71 until relay 207 is again energized. The valve 214 is spring biased to a central position in which the motors 70, 71 are disconnected from the supply of fluid so that the plate 17 of the carriage C is free to move transversely of the runway formed by the rails 61, 62, that is, axially of the axis of rotation of the lathe spindles. The purpose of this is to allow the log to move lengthwise with the lathe spindles, if necessary, when the spindles engage the log as hereinafter explained.

The closing of the normally open contacts 205, 206 of carriage in limit switch 183 causes one or both of the lathe spindles 7, 8 to move in, that is, towards the center of the lathe depending upon whether or not a "two position selector" switch 215 is in its "single spindle" or "dual spindle" position. If in its "dual spindle" position, both spindles move in; if it is in the "single spindle" position, merely the far or head spindle 7 moves in. Obviously the circuit can be arranged so that the near spindle 8 moves in instead of the far spindle. It is to be understood that when the selector valve 215 is in the "single spindle" position, the tail spindle is manually preset in a predetermined desired extended position.

For the present purposes it will be assumed that the selector switch 215 is set in its "dual spindle" position, that is, the position in which it is shown in the wiring diagram. With this setting of the selector switch 215, the closing of contacts 205, 206 of carriage limit switch 183 establishes a circuit from the wire 104 through the now closed contacts 216, 217 of selector switch 95, wire 218, contacts 205, 206, wire 219, normally closed contacts 220, 221 of adjustable pressure responsive switch 222, wire 223 and operating solenoid 224 of solenoid operated valve 225 which controls the flow of pressure fluid to and from the fluid operated motor which reciprocates the far spindle 7 to the line 116. Simultaneously a circuit is established from the wire 223 through the now closed contacts 226, 227 of selector switch 215, wire 228 and the operating solenoid 229 of "solenoid operate" valve 230 which controls the flow of pressure fluid to and from the fluid operated motor which reciprocates the near spindle 8 to the line 116. Energization of the solenoids 224, 229 of valves 225, 230 shifts the valves to admit fluid, preferably hydraulic, to the spindle motors or cylinders in such a direction that the spindles move towards the ends of the log therebetween, that is, towards one another. The spindles continue to move in until the chucks carried thereby are firmly embedded in the ends of the logs whereupon a back pressure is built up in the cylinders which operates the adjustable pressure responsive switch 222 to open its normally closed contacts 220, 221, referred to above, and close its normally open contacts 231, 232. The opening of contacts 220, 221 of pressure switch 222 breaks the circuit for valve 225, 230 allowing them to return to their neutral positions to which they are spring biased with hydraulic fluid trapped in the spindle motors. If it is desired to maintain pressure on the spindles during the cutting operation the contacts 220, 221 of switch 222 can be omitted. The spindles can be moved into engagement with the log at any time by the operator depressing either the "far spindles in" push button switch 233 or the "near spindle in" push button switch 234. If the selector switch 215 is in its open position the switches 233, 234 control only their respective far and near spindles 7, 8, respectively.

The closing of contacts 231, 232 of pressure responsive switch 222 establishes a circuit from the line 104 through the now closed contacts 231, 232, wire 235 and operating solenoid 236 of cycle relay 153, previously referred to, to the line 116. Energization of the operating solenoid 236 of lathe cycle relay 153 actuates the relay to open its normally closed contacts 151 and close its normally open contacts 240, 241, 241', 242, 243, 244 and 245 and opens its normally closed contacts 246. The operation of cycle relay 153 causes the clamp members 11, 11' of the log carriage C to release the log which is now held by the lathe spindles; the log carriage to move out of the lathe; the clamp motors 45, 45' to reverse; the log carriage to re-center; the lathe drive motor to start; the pressure bar E to release; and the lathe carriage F to move towards the log at traverse speed, all as will be presently explained.

The opening of the normally closed contacts 151 of cycle relay 153 breaks the holding circuit for the clamp actuating relay 137 thereby allowing the clamp valve 156 to return to its normal position to which it is biased by a spring. This allows the clamp members 11, 11' to return to their horizontal or down position so as to allow them to pass underneath the log in the lathe as the carriage C returns to its out or retracted position.

The closing of the normally open contacts 240 of the cycle relay 153 establishes a circuit from the wire 104 through the now closed contacts 240, wire 250, normally open but now closed contacts 251, 252 of carriage out limit switch 122 which closed upon the carriage C moving away from the switch, wire 253, operating solenoid 254 of solenoid valve 197 to line 116. As previously stated, valve 197 controls the flow of fluid to and from the motor 80 which reciprocates the carriage into and out of the lathe and the energization of the operating solenoid 254 thereof shifts the valve so as to reverse the direction of movement of the motor 80 thereby causing the carriage C to be returned to its out or retracted position. The charger carriage continues to move out until it reaches its retracted position whereupon it actuates charger carriage out limit switch 122 closing its normally open contacts 120, 121 and opening its normally closed contacts 251, 252. The opening of the latter contacts deenergizes operating solenoid 254 of valve 197 allowing the valve to return to its neutral position.

The closing of the normally open contacts 241 of cycle relay 153 establishes a circuit from the line 104 through the now closed contacts 241, wire 260, operating solenoid 261 of motor controller 174 for motor 45, wire 262 and log clamp B, open limit switch 263 to wire 116. Energization of the operating solenoid 261 of motor controller 174 reverses the direction of rotation of the motor 45 causing it to move the clamp members 10, 11 away from one another. The motor continues to rotate until the limit switch 263 is opened by the actuation thereof by the left-hand end of the member 53, as viewed in FIG. 2. When this occurs the clamp members 10, 11 are in their open or retracted positions. The limit switch 263 is connected to the plate or member 17 of the carriage C. The motor 45' of the clamp assembly B' is reversed in a similar manner by the closing of contacts 241' of lathe cycle relay 153 and is stopped by the opening of limit switch 263' corresponding with the switch 263. The contacts 241' are connected to the reverse solenoid 261' of the motor controller 174' by wire 260' and the connection between the reverse solenoid 261' and limit switch 263' is made by wire 262'.

The base 17 of the carriage C, and the mechanism carried thereby, is again centered with respect to the rails 61, 62 and the wheels 60 by the closing of the normally open contacts 242 of cycle relay 153. This establishes a circuit from the wire 104 through the now closed contacts 242, wire 265, operating solenoid 208 of carriage centering relay 207 to line 116. Energization of the carriage centered relay 207 closes its normally open contacts 209, 210, 211, previously referred to. The closing of the contacts 209 establishes a holding circuit for the relay 207 from the wire 104 through the now closed contacts 203, 204 of carriage in limit switch 183, which have closed upon the initial move of the carriage C towards its out or retracted position, wire 266 and now closed contacts 209 to wire 265. Assuming that the plate 17 of the charger C was shifted towards the near side of the apparatus upon the lathe spindles engaging the log, thus causing the stop or actuator 68 to close limit switch 267, the closing of contacts 210 of relay 207 establishes a circuit from the wire 104 through the now closed contacts 210, wire 268 and operating solenoid 212 of carriage centering valve 214 to line 116. This actuated the valve 214 to connect the motors 70, 71 to the source of fluid to cause them to center the base plate 17 of the carriage C between the rails 60. When this occurs the switch 267 again opens. If the charger plate 17 had been shifted in the opposite direction upon the chucking of the log the switch 269 would have closed and the closing of contacts 211 of relay 207 would have established a circuit from the wire 104, therethrough and the wire 270, operating solenoid 213 of valve 214 and limit switch 269 to line 116, thereby connecting the motors 70, 71 to the source of fluid but in the opposite direction. As the plate 17 reaches center the switch 269 again opens by its moving from underneath the control member 68. The control member 68 is such that one or the other of the operating arms of the switches 267, 269 is underneath the same and closed thereby except when the plate 17 is in the desired position. The member 68 can be adjusted to position the plate 17 in either its far or near extreme positions with respect to the frame of the log or charger carriage C or in any intermediate position.

Upon the carriage C reaching its out or retracted position, the limit switch 122 is actuated, as previously stated, to open its then closed contacts 251, 252 and disconnect the supply of pressure fluid to the motor 80 allowing the valve 197, which is spring biased to a neutral position, to return thereto. Simultaneously with the opening of contacts 251, 252 of limit switch 122, contacts 120, 121 thereof close and upon the reclosing of these contacts the motor for the conveyor A is again started and the clamp members 11, 11′ raised to operative position, because when the start push button switch 100 was initially depressed, in addition to closing its contacts 108, 110, previously referred to, contacts 275, 276 thereof were closed establishing a circuit from the line 104 through the now closed contacts 161, 162 of selector switch 95, wire 163, contacts 275, 276, wire 283 and operating solenoid 284 of relay 285 to line 116. Energization of the operating solenoid 284 of relay 285 closed its normally open contacts 286, 287. The closing of contacts 287 establishes a holding circuit for the relay from the wire 163 to the wire 283 around the start push button switch contacts 275, 276. The closing of normally open contacts 287 of relay 285 establishes a circuit from the wire 104 through now closed contacts 161, 162 of selector switch 95, wire 163, now closed contacts 287 of relay 285, wire 288, normally closed contacts 165 of relay 163, wire 118, now closed but normally open contacts 120, 121 of charger carriage back limit switch 122, wire 123, now closed contacts 124, 125 of log actuated limit switch 126, wire 111, stop log conveyor push button switch 112, wire 113 and operating solenoid 114 of motor controller 115 for the log conveyor motor to line 116, in series circuit with the selector switch contacts 280, 281 of the selector switch 95, and the wire 282 with the contacts 108, 110 of start switch 100.

That part of the cycle, previously described wherein a log on conveyor A is dropped into the clamp assemblies B and B′ on the carriage C and centered and secured between the clamp members thereof, is repeated, but the carriage will not move into the lathe until the spindles are retracted because of the now open contacts 193 of relay 194 which will not close until the far and near spindles 7, 8 reach their retracted positions and close contacts 290, 291 of limit switch 293 and contacts 294, 295 of limit switch 296, in series circuit with the operating solenoid 297 of relay 194. This circuit is completed by the limit switches 293, 296 from the wire 104, through the now closed contacts 300, 301 of selector switch 95, wire 302, contacts 290, 291 of switch 293, wire 303, contacts 294, 295 of switch 296, wire 304 and operating solenoid 297 of relay 194 to line 116. If selector switch 215 is in its "single spindle" position a pair of contacts 306, 307 thereof are closed shorting out contacts 294, 295 of limit switch 296 associated with the near spindle B.

The carriage C can be manually reutrned to its retracted or out position by the operator depressing the carriage return push button switch 147 to open its normally closed contacts 145, 146, which breaks the holding circuit for the clamp relay thereby releasing the clamp members 11, 11′. Simultaneously the normally open contacts 310, 311 are closed to energize the carriage out solenoid 254 of valve 197; the normally open contacts 312, 313 and 312′, 313′ are closed to reverse the motors 45, 45′, respectively, and the normally open contacts 314, 315 are closed to energize the carriage centering relay 207.

Reverting again to the sequence of operations which take place upon the energization of the cycle relay 153, the closing of the normally open contacts 243 of the cycle relay 153 establishes a circuit from the wire 104 through the now closed contacts 243 of relay 153, wire 320, "main drive motor stop" push button switch 321, wire 322, and operating solenoid 323 of motor controller 324 for the main drive motor of the lathe to the line 116. The motor continues to run as long as the cycle relay is energized which is until the pressure is released from the spindle motors at the conclusion of the peeling operation. The motor can be started and stopped at any time by the start push button switch 325 and the stop push button switch 321.

The closing of the normally open contacts 244 of cycle relay 153 established a circuit from the wire 104 through the normally closed contacts 330 of "lathe feed clutch" relay 331, wire 332, contacts 244, wire 333, stop push button switch 334, and operating solenoid 335 of "pressure bar open" valve 336 to line 116 thereby actuating the valve to connect a fluid actuated motor, not shown, to a source of fluid, to rotate the rod 337 of the lathe D in in such a direction that the pressure bar assembly F is retracted with respect to the knife proper, as is well understood in the art. This facilitates the rounding up of the log preparatory to peeling the same. The pressure bar may be retracted manually by the operator depressing the push button switch 338 connected in series circuit between the wires 104 and 333.

The closing of contacts 245 of cycle relay 153 establishes a circuit from the wire 104 through the now closed contacts 350, 351 of "knife into depth" limit switch 352, wire 353, normally closed contacts 354 of timing relay 355, wire 356, contacts 245, wire 357, interlock contacts 358 of motor controller 360, wire 361 and forward operating solenoid 362 of knife carriage traverse motor controller to line 116. Energization of forward operating solenoid actuates the motor in the direction to rotate the knife carriage feed screws 363 to move the knife carriage towards the log. Simultaneously interlock contacts 364 of motor controller 360 open preventing concurrent reverse operation of the knife carriage traverse motor and the feed clutch with operation of the motor in the forward direction. The knife carriage E may be moved in at any time by the operator depressing the "knife carriage in" push button switch 365.

The knife carriage E moves in, that is, towards the log until the operator depresses the "feed clutch start" push button switch 370 establishing a circuit from the wire 104 through normally closed stop push button switch 371, wire 374, now closed push button switch 370, wire 375 and operating solenoid 376 of timer relay 355 to line 116. Energization of timer relay 355 actuates the relay to open its normally closed instant open contacts 354 stopping the knife carriage traverse motor, and closes its instant close contacts 377, establishing a holding circuit for the operating solenoids 376 thereof from the wire 104 through the normally closed contacts 380 of lathe feed clutch relay 331, wire 382, now closed contacts 377 of relay 355 to wire 375. Delayed closing contacts 383 of time delay relay 355 subsequently closes establishing a circuit from the wire 104 through the normally closed stop push button switch 371, wire 374, normally closed contacts 384, 385 of knife carriage in limit switch 352, wire 386, now closed contacts 383 of timer relay 355, wire 387, normally closed contacts 364 of starter 360, wire 388 and operating solenoid 390 of "feed clutch" relay 331 to line 116. The energization of the operating solenoid 390 of relay 331 actuates the relay to close its normally open contacts 391 establishing a holding circuit about the contacts 383 of timer relay 355, and opens its normally closed contcats 330, 380. The opening of contacts 330 interrupts the circuit for the pressure bar valve 336, which valve is spring biased to open position, allowing the pressure bar, which is also biased to closed position, to close, and the opening of contacts 380 interrupts the holding circuit for timer relay 355. Simultaneously with the energization of the operating solenoid 390 of relay 331, the operating solenoid 392 of a "feed clutch" valve 393, which solenoid is in parallel circuit with the operating solenoid 390 of relay 331, was energized causing the valve 393, which is spring biased to open position, to connect a fluid actuated motor which engages the feed clutch to a source of fluid pressure. The knife carriage now continues to move towards the axis of rotation of the spindles of the lathe and the peeling operation to be performed.

Because of the varying sizes of the logs peeled, it is difficult to disconnect the traverse drive for the knife carriage and engage the feed clutch automatically. It is usually necessary to have the operator control the "rounding up" operation. If, however, it is desired to automatically perform this function, for example, when peeling cores or logs of fairly uniform size, the knife carriage traverse motor can be stopped and the feed clutch engaged when the knife carriage reaches some predetermined position with respect to the axis of rotation of the spindles of the lathe by the closing of a normally open limit switch connected in parallel circuit with the manually operable push button switch 370 by a suitable trip on the lathe or knife carriage.

The knife carriage continues to move in and the peeling operation to continue until a stop 400 on the knife carriage strikes the "knife carriage in limit" switch 352 to open its normally closed contacts 350, 351 and 384, 385 and close its normally open contacts 401, 402. The opening of the normally closed contacts 350, 351 merely assures against starting of the knife carriage traverse motor accidentally in event the operator should push or depress the push button switch 365. The opening of normally close contacts 384, 385 of limit switch 352 breaks the holding circuit for the feed clutch relay 331 and the feed clutch valve 393 allowing the valve to return to normal position thus disengaging the feed clutch. Deenergization of the operating solenoid 390 of the feed clutch relay 331 allows its normally closed contacts 330 to reclose reenergizing the operating solenoid 335 of pressure bar valve 336 to release the pressure bar B.

The closing of the normally open contacts 401, 402 of limit switch 352 causes both spindles to retract by establishing a circuit from the wire 104 through the now closed contacts 405, 406, selector switch 95, wire 407, now closed contacts 401, 402 of limit switch 352, wire 408, now closed contacts 410, 411 of "far spindle out" limit switch 293, wire 412 and operating solenoid 413 of relay 414 to line 116. Simultaneously, a circuit is established from the wire 412 through the operating solenoid 415 of valve 225 to line 116. The operating solenoid 415 of valve 225 is in parallel circuit with the operating solenoid 413 of relay 414 between the wire 412 and the line 416. The energization of the operating solenoid 415 of valve 225 shifts the valve so as to connect the reciprocating type fluid pressure actuated motor associated with the far spindle with a source of hydraulic pressure such that the spindle begins to retract. The energization of the operating solenoid 413 of relay 414 closes its normally open contacts 416 which establishes a holding circuit for the relay from the wire 104 to the wire 408. The spindle continues to move out until the now closed contacts 410, 411 of the "far spindle out" limit switch 293 are broken. This breaks the holding circuit from the relay 414 and deenergizes the operating solenoid 415 of valve 225 allowing the valve to return to its normal or central position, to which position it is spring biased. The far spindle may be manually retracted at any time by the operator depressing the "far spindle out" push button switch 417 connected between the wire 104 and the wire 408.

Since the selector switch 215 is in its dual spindle position, previously assumed, the near spindle out relay 420 is simultaneously energized along with the far spindle out relay 414. The circuit is from the wire 408 through the now closed contacts 421, 422 of selector switch 215, wire 423, now closed but normally open contacts 424, 425 of "near spindle out" limit switch 296, wire 426 and operating solenoid 427 of relay 420 to line 116. Simultaneously the operating solenoid 428 of solenoid valve 230, which is in parallel circuit with the operating solenoid 427 of relay 420 between the wire 426 and the line 116, is energized shifting the valve to the position in which it connects the reciprocating type fluid pressure actuated motor associated with the near spindle to the source of hydraulic pressure such that the spindle begins to retract. The energization of the operating solenoid 427 of relay 420 closes its normally open contacts 430, to establish a holding circuit for the relay 420 from the line 104 to the wire 423. The spindle continues to move out until the "near spindle out" limit switch 296 is actuated to open contacts 424, 425. The near spindle can be retracted at any time by the operator depressing the "near spindle out" push button switch 431.

If the selector switch 215 is in its single spindle position, merely the near spindle will be retracted upon the closing of contacts 401, 402 of knife carriage in limit switch 352. The circuit can be readily arranged so that the near spindle retracts in place of the far spindle upon the closing of the contacts 401, 402 of the knife carriage in limit switch 352 as will be readily understood in the art or other suitable cycles of operation may be employed.

In the preferred embodiment shown, the pressure responsive valve 222 is preferably connected to the far spindle, which spindle is reciprocated regardless of the position of the selector switch 215 and upon the initiation of the retraction of the spindle, the contacts 220, 221 of pressure responsive switch 222 again close and contacts 231, 232 thereof open. The opening of the contacts 231, 232 deenergizes the cycle relay 153 allowing the normally open contacts thereof to reopen and the normally closed contacts thereof to reclose. The reclosing of contacts 151 of cycle relay 153 does not perform any function at this time. The same is true of the reopening of contacts 240, 241, 241', 242 and 245. The reopening of contacts 243 of cycle relay 153 stops the main drive motor and the reopening of contacts 244 of cycle relay 153 continues the operating solenoid 335 of pressure bar valve 336 open subsequent to the reclosing of contacts 330 of the feed clutch relay 331 and thus continuing the pressure bar in its operating position. The reclosing of contacts 246 of cycle relay 153 establishes a circuit from the wire 104 through the normally closed contacts 380 of feed clutch relay 331, wire 382, normally closed "knife carrier back" limit switch 431, wire 432, now closed contacts 246 of cycle relay 153, wire 433, interlock contacts 363 of motor controller 360, wire 434 and reverse operating solenoid 435 of motor controller 360 to line 116. Energization of the reverse operating solenoid 435 causes the traverse motor for the knife carriage to operate in the direction to retract the knife from the axis of rotation of the spindles. The knife carrier continues to move back until the stop 400, previously referred to, opens the "back limit" switch 431. The opening of contacts 246 of cycle relay 153 upon the gripping of the log to be peeled between the spindles of the lathe prevented energization of the reverse solenoid 435 of knife carriage traverse motor controller 360 upon the knife carrier moving away from the knife back limit switch 431, in the event it is moving away therefrom by the feed clutch as distinguished from the knife carriage traverse motor.

Upon each of the spindles 7, 8 reaching their retracted or out positions and the closing of the contacts 290, 291, and 294, 295, of their respective out limit switches 293, 296, relay 194, previously referred to, is energized thereby closing its normally open contacts 193, causing the log carriage to move into the lathe assuming that a log has been properly clamped between the clamp members of the clamp assembly of the log carriage, as previously explained. The cycle of operation will be repeated as long as logs are available on the conveyor A and the selector switch 95 is continued in its automatic position.

From the foregoing description of the preferred embodiment of the invention it is believed that it will be apparent that there has been provided a new and improved apparatus for working lots, including removing bark therefrom and/or forming them into veneer, and that there has also been provided new and improved mechanism for sequentially loading or charging logs and the like into a lathe which may be sold as a separate article of commerce.

While the preferred embodiment of the invention has been shown and described in considerable detail, the invention is, as previously stated, not limited to the particular apparatus shown and described but may be otherwise embodied.

In the preferred embodiment of the invention shown the lathe spindles 7, 8 are reciprocated by fluid actuated reciprocating type double acting motors but screw operated spindles could be employed. The spindles of this character are well known in the prior art. In this event, however, the pressure responsive switch 222 would be replaced by some type of torque or load responsive switch, the operation of which would respond to or be a function of the secure clamping of the log between the spindles.

It is also to be understood that different cycles of operation other than those specifically referred to in the foregoing description may be employed. For example, the control may be modified such that the lathe will not be automatically started upon the log carriage reaching its in position, if desired, by substituting a push button switch for the carriage in limit switch 183. It is also to be understood that the in position of the log carriage may be controlled by the carriage in limit switch rather than by the piston of the motor 80 engaging against the left-hand end of the cylinder within which it reciprocates.

Other modifications will be apparent to those skilled in the art to which the invention relates and it is the intention to hereby cover all modifications, adaptations and uses of the invention herein disclosed which come within the practice of those skilled in the art to which the invention relates.

Having thus described my invention, what I claim is:

1. In apparatus for feeding logs and the like to a machine having spaced axially aligned rotatable spindles between which a log is adapted to be supported and rotated with its longitudinal center aligned or approximately aligned with the axis of rotation of the spindles, a log carrier, a plurality of spaced clamp assemblies, each clamp assembly having a least two clamp members at least one of which has a dihedral or V-shaped abutment face, means supporting the respective clamp members of each of said clamp assemblies in said log carrier for linear movement towards and from one another in generally horizontal paths, discrete power means for moving the respective clamp members of each of said clamp assemblies simultaneously toward one another along said generally horizontal paths and an imaginary line parallel with the axis of rotation of said spindles at predetermined speeds to cause the abutment faces thereof to center and clamp a log positioned therebetween with its longitudinal center aligned or approximately aligned with said imaginary line, means for supporting said log carrier for movement in a generally horizontal path transversely of said imaginary line, and power means for moving said log carrier along said last mentioned horizontal path.

2. In apparatus for feeding logs and the like to a machine having spaced axially aligned rotatable spindles between which a log is adapted to be supported and rotated with its longitudinal center aligned or approximately aligned with the axis of rotation of the spindles, a log carrier, a plurality of spaced clamp assemblies, each clamp assembly having at least two clamp members at least one of which has a dihedral or V-shaped abutment face, means supporting the respective clamp members of each of said clamp assemblies in said log carrier for linear movement toward and from one another in generally horizontal paths, discrete power means for moving the respective clamp members of each of said clamp assemblies simultaneously toward one another along said generally horizontal paths and an imaginary line parallel with the axis of rotation of said spindles at predetermined speeds to cause the abutment faces thereof to center and clamp a log positioned therebetween with its longitudinal center aligned or approximately aligned with said imaginary line, means for supporting said log carrier for movement in a generally horizontal path transversely of said imaginary line, power means for moving said log carrier along said last mentioned horizontal path whereby a log carried thereby may be loaded into the machine, means for pivotally supporting said clamp member of each clamp assembly nearest the machine to be loaded about axes below and parallel to said imaginary line, and power means for moving said pivotally supported clamp members.

3. In a lathe for peeling, debarking or the like of logs having spaced axially aligned rotatable spindles between which a log is adapted to be supported and rotated with its longitudinal center aligned or approximately aligned with the axis of rotation of the spindles and reversible power means for producing relative movement of the spindles toward and from one another, apparatus for sequential feeding of logs to said lathe with the longitudinal centerlines thereof aligned or approximately aligned with the axis of rotation of said spindles including, means supporting said log carrier for movement of a log carried thereby into and out of the lathe, a plurality of clamp assemblies spaced on said carrier transversely of its said path of movement into and out of the lathe, each of said clamp assemblies having at least two clamp members at least one of which has a dihedral or V-shaped abutment face, means supporting the respective clamp members of each of said clamp assemblies for linear movement toward and from one another to clamp or release a log therebetween, means pivotally supporting said clamp member of each clamp assembly nearest the lathe for movement about an axis offset vertically and parallel to the axis of rotation of the spindles, means for releasably maintaining said pivotally supported clamp members in position to engage a log positioned in said clamp assemblies, discrete reversible power means for moving the respective clamp members of each of said clamp assemblies toward and from one another and an imaginary line parallel with the axis of rotation of the spindles of the lathe to cause the abutment faces thereof to center and clamp a log positioned therebetween with its longitudinal center aligned or approximately aligned with said imaginary line, means for controlling actuation of said reversible power means to move the respective clamp members of said clamp assemblies toward one another, reversible power means for moving said log carrier to move a log carried thereby into position in the lathe to be engaged by the rotatable spindles of the lathe.

4. In a lathe for peeling, debarking or the like of logs, spaced axially aligned rotatable spindles between which a log is supported and rotated with its longitudinal center aligned or approximately aligned with the axis of rotation of said spindles, reversible power means for producing relative movement of said spindles toward and from one another, a log carrier means supporting said log carrier for movement of a log carried thereby into and out of the lathe, a plurality of clamp assemblies spaced on said carrier transversely of its said path of movement into and out of the lathe, each of said clamp assemblies having at least two clamp members at least one of which has a dihedral or V-shaped abutment face, means supporting the respective clamp members of each of said clamp assemblies for linear movement toward and from one another to clamp or release a log therebetween, means pivotally supporting said clamp member of each clamp assembly nearest the lathe for movement about an axis offset vertically and parallel to the axis of rotation of the spindles, power means for releasably maintaining said pivotally supported clamp members in position to engage a log positioned in said clamp assemblies, discrete reversible power means for moving the respective clamp members of each of said clamp assemblies toward and from one another and an imaginary line parallel with the axis of rotation of the spindles of the lathe to cause the abutment faces thereof to center and clamp a log positioned therebetween with its longitudinal center aligned or approximately aligned with said imaginary line, means for controlling actuation of said reversible power means in response to the positioning of a log in said clamp assemblies to move the respective clamp members of said clamp assemblies toward one another to clamp the log therebetween, reversible power means for moving said log carrier, means for controlling actuation of said reversible power means to move a log carried by said carrier into position in the lathe to be engaged by the rotatable spindles of the lathe, means for controlling actuation of said power means to produce relative movement of said spindles toward one another in response to completion of said last named movement of said log carrier, and means responsive to engagement of the log by said spindles for controlling actuation of said power means to release said pivotal clamp member and said reversible power means for moving said log carrier to retract said clamp assemblies from said lathe moving the respective clamp members of said clamp assemblies toward one another in response to the positioning of a log therebetween to center and clamp the log, fourth reversible power actuated means for moving said log carrier to position the center of a log carried thereby in alignment or approximately in alignment with the axis of rotation of said spindles, fifth means for controlling the actuation of said fourth reversible power actuated means to cause said carrier to position a log thereon between said spindles, and sixth means for controlling the actuation of said first reversible power actuated means.

5. In a lathe for peeling, debarking or the like of logs, spaced axially aligned rotatable spindles between which a log is supported and rotated with its longitudinal center aligned or approximately aligned with the axis of rotation of said spindles, first reversible power means for producing relative movement of said spindles toward and from one another, a log carrier, means supporting said log carrier for movement of a log carried thereby into and out of the lathe, a plurality of clamp assemblies spaced on said carrier transversely of its said path of movement into and out of the lathe, each of said clamp assemblies having at least two clamp members at least one of which has a dihedral or V-shaped abutment face, means supporting the respective clamp members of each said clamp assemblies for linear movement toward and from one another to clamp or release a log therebetween, means pivotally supporting said clamp member of each clamp assembly nearest the lathe for movement about an axis offset vertically and parallel to the axis of rotation of the spindles, power means for releasably maintaining said pivotally supported clamp members in position to engage a log positioned in said clamp assemblies, discrete reversible power means for moving the respective clamp members of each of said clamp assemblies toward and from one another and an imaginary line parallel with the axis of rotation of the spindles of the lathe to cause the abutment faces thereof to center and clamp a log positioned therebetween with its longitudinal center aligned or approximately aligned with said imaginary line, means for controlling actuation of said reversible power means in response to the positioning of a log in said clamp assemblies to move the respective clamp members of said clamp assemblies toward one another to clamp the log therebetween, reversible power means for moving said log carrier, means for controlling actuation of said reversible power means to move a log carried by said carrier into position in the lathe to be engaged by the rotatable spindles of the lathe, means for controlling actuation of said power means to produce relative movement of said spindles toward one another in response to completion of said last named movement of said log carrier, means responsive to engagement of the log by said spindles for controlling actuation of said power means to release said pivotal clamp member and said reversible power means for moving said log carrier to retract said clamp assemblies from said lathe, a tool carrier movable transversely of the axis of rotation of said spindles, reversible power means for moving said tool carrier, and means for controlling actuation of said reversible power means to move said tool carrier toward the axis of rotation of said spindles as a function of the engagement of said spindles with a log therebetween.

References Cited by the Examiner

UNITED STATES PATENTS

| | | |
|---|---|---|
| 1,646,115 | 10/27 | Sjostrom. |
| 2,441,925 | 5/48 | Wege. |
| 2,523,563 | 9/50 | Foreman. |
| 3,037,538 | 6/62 | Graham. |

WILLIAM W. DYER, Jr., *Primary Examiner.*

WALTER A. SCHEEL, DONALD R. SCHRAN,
*Examiners.*